R. J. FLEMING & T. A. ROBINSON.
RIMLESS EYEGLASSES.
APPLICATION FILED NOV. 30, 1912.
1,084,262.
Patented Jan. 13, 1914.
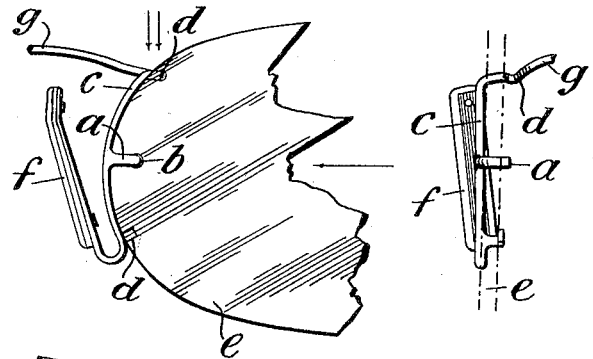
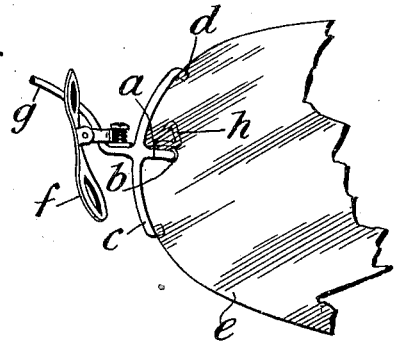
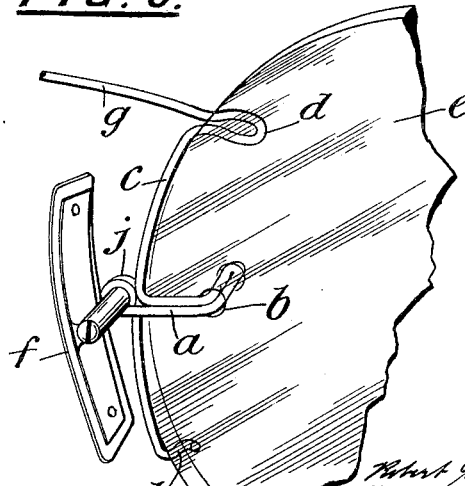
Witnesses:—
Hyperion Barry.
F. George Barry
Inventors:
Robert James Fleming and
Thomas Alfred Robinson
by their attorneys
Brown & Seward

UNITED STATES PATENT OFFICE.

ROBERT JAMES FLEMING AND THOMAS ALFRED ROBINSON, OF LONDON, ENGLAND.

RIMLESS EYEGLASSES.

1,084,262.  Specification of Letters Patent.  Patented Jan. 13, 1914.

Application filed November 30, 1912. Serial No. 734,319.

*To all whom it may concern:*

Be it known that we, ROBERT JAMES FLEMING, manufacturing optician, and THOMAS ALFRED ROBINSON, spectacle-maker, both subjects of the King of Great Britain, and residents of 136 to 142 Clerkenwell road, London, England, have invented new and useful Improvements in Rimless Eyeglasses, of which the following is a specification.

The present invention relates to rimless eyeglasses of the kind in which the lenses are detachably mounted, and consists in a new method of detachably mounting the lenses. The disadvantage of rimless glasses in which the lenses are not so mounted is that the mounting requires great care and skill to avoid a fracture of the glass, and in the event of a wearer breaking a lens he has consequently to send his glasses to an optician to have a new lens fitted. Furthermore, glasses which are held between lugs which are pulled together by a screw sometimes to exert an excessive pressure on the glass are very liable to fracture at any shock or jar. Attempts have therefore been made to provide a mounting of such a kind that an old lens can be removed or a new one fitted quite easily by the wearer, and our invention seeks to provide improved means for this purpose.

At the point where the attaching lugs are now placed in ordinary rimless glasses we propose to fit a cranked pin adapted to engage with a hole drilled through the lens near the edge thereof. On either side of this pin are short spring arms or fingers which may be shaped to conform to a portion of the periphery of the lens and which are provided with lateral extensions situated so as to grasp lightly the lens at the edges. We may here observe that the cranked pin may be made in any way that suits the convenience of the manufacturer for any particular pattern of frame. For instance, it may be simply a bent portion of the wire which forms the frame. Further according to our invention in order that the frame should be as simple to manufacture and as light as possible, we make the whole frame including the nose bridge, the spring arms, the body of the cranked pin and in some cases the body and hook portion of the cranked pin, from one piece of metal. The hole of the lens is hooked onto the pin and the pressure of the fingers against the periphery holds the lens in position.

In the case where the spring arms and the cranked pin are made from one continuous piece of wire, the elasticity of the arms is accentuated by giving the wire a coil at a point between the extremities of the said arms, and this coil may even be utilized to hold the pin which carries the pivoted plaquet.

Turning to the drawings which accompany this specification, Figure 1 shows in face view the method of mounting the lens according to our invention. Fig. 2 is a view taken in the direction of the single arrow. Fig. 3 is a view taken in the direction of the double arrows. Fig. 4 shows the method of mounting applied to finger piece eyeglasses. Fig. 5 shows the method of mounting adopted when a coil is given to the wire framework as mentioned above.

In all the figures like parts are designated by the same letters.

$a$ is the cranked pin taking into a hole $b$.

$c$ are the spring arms or fingers. $d$ are their lateral extensions situated to grasp the rim of the lens $e$.

$f$ are the plaquets. $g$ the bridge.

$h$ is the finger piece in Fig. 4.

$i$ is the coil situated between the extremities of the spring arm shown in Fig. 5.

It is clear that with a mounting of this kind the lens is securely held and may be easily fitted or removed. The framework necessary to hold the lens is small in extent and is light, inconspicuous, and easy to manufacture.

The invention may be applied to rimless eyeglasses with nose pieces and plaquets of any pattern.

What we claim and desire to secure by Letters Patent of the United States is:—

1. Rimless eyeglasses in which the lenses are detachably mounted, means for holding the lenses comprising a cranked pin constructed to hook into a hole drilled in the lens and spring arms or fingers with lateral extensions adapted to engage the edge of the lens on the surface opposite to that in which the hook on the pin enters, the nose bridge, the spring fingers and the body of the cranked pin being formed from one piece of metal.

2. Rimless eyeglasses in which the lenses are detachably mounted, lens holding means comprising a flattened cranked pin provided with a hook arranged to enter a hole drilled in the lens, and spring arms or fingers with lateral extensions adapted to engage the edge of the lens on the surface opposite to that in which the pin enters, the nose bridge, the spring fingers and the flat portion of the cranked pin being formed from one piece of metal and the hook portion being separately attached to the flat portion of the cranked pin.

3. Rimless eyeglasses in which the lenses are detachably mounted and lens holding means comprising a cranked pin provided with a hook arranged to enter a hole drilled in the lens and spring arms or fingers with lateral extensions adapted to engage the edge of the lens on the surface opposite to that in which the pin enters, the nose bridge, the spring fingers and the cranked portion of the pin being formed from one continuous piece of wire, the said wire having a coil in it between the spring fingers for increasing the elasticity thereof.

In testimony whereof we have signed our names to this specification in the presence of two subscribing witnesses.

ROBERT JAMES FLEMING.
THOMAS ALFRED ROBINSON.

Witnesses:
  HERBERT D. JAMESON,
  ALFRED S. BISHOP.

---

Copies of this patent may be obtained for five cents each, by addressing the "Commissioner of Patents, Washington, D. C."